United States Patent
Lemaire et al.

(10) Patent No.: US 8,522,432 B2
(45) Date of Patent: Sep. 3, 2013

(54) METHOD OF MANUFACTURING A PISTON FOR A HYDRAULIC MOTOR HAVING RADIAL PISTONS

(75) Inventors: Gilles Lemaire, Margny les Compiegnes (FR); Alain Noel, Brech (FR)

(73) Assignee: Poclain Hydraulics Industrie, Verberie (FR)

( * ) Notice: Subject to any disclaimer, the term of this patent is extended or adjusted under 35 U.S.C. 154(b) by 0 days.

(21) Appl. No.: 13/314,469

(22) Filed: Dec. 8, 2011

(65) Prior Publication Data

US 2012/0073133 A1 Mar. 29, 2012

Related U.S. Application Data

(62) Division of application No. 12/295,426, filed as application No. PCT/FR2007/051043 on Mar. 30, 2007, now Pat. No. 8,281,707.

(30) Foreign Application Priority Data

Mar. 31, 2006 (FR) ...................... 06 51131

(51) Int. Cl.
*B23P 15/10* (2006.01)
*F04B 1/04* (2006.01)

(52) U.S. Cl.
USPC ............ 29/888.042; 29/412; 29/413; 29/414; 29/415; 29/416; 29/417; 92/148; 91/494

(58) Field of Classification Search
USPC ........... 29/888.04, 888.042, 888.05, 888.051, 29/412–417; 91/472, 481, 491, 492, 494; 92/72, 148, 172; 123/193.6
See application file for complete search history.

(56) References Cited

U.S. PATENT DOCUMENTS

| | | | |
|---|---|---|---|
| 4,043,255 A | 8/1977 | Cunningham | |
| 4,658,487 A * | 4/1987 | Gachot | 29/888.04 |
| 4,747,339 A | 5/1988 | Wusthof et al. | |
| 4,930,994 A | 6/1990 | Budecker | |
| 5,218,762 A * | 6/1993 | Netto Da Costa | 29/888.02 |
| 6,276,261 B1 | 8/2001 | Manfreda | |
| 6,412,474 B1 | 7/2002 | Guentert et al. | |
| 2004/0003711 A1 | 1/2004 | Manfreda | |

FOREIGN PATENT DOCUMENTS

| | | |
|---|---|---|
| DE | 23 51 465 B1 | 3/1975 |
| DE | 31 21 530 A1 | 12/1982 |
| DE | 198 09 315 A1 | 9/1999 |
| FR | 2648512 A | 12/1990 |
| GB | 2 064 700 A | 6/1981 |
| WO | 98/14722 A1 | 4/1998 |
| WO | 01/81727 A1 | 11/2001 |

OTHER PUBLICATIONS

International Search Report: PCT/FR2007/051043.

* cited by examiner

*Primary Examiner* — Sarang Afzali
(74) *Attorney, Agent, or Firm* — Ladas & Parry LLP

(57) ABSTRACT

A method for manufacturing radial pistons for a hydraulic motor by machining cylindrical transverse holes at regular intervals in a bar, and, in order to form two adjacent pistons, cutting up the bar on a transverse cutting-up plane passing through one of said holes so that a first portion of said hole forms a cradle-shaped recess in the base of the first one of the two adjacent pistons and so that another portion of said hole forms a cradle-shaped recess in the top of the second one of the two adjacent pistons.

3 Claims, 2 Drawing Sheets

METHOD OF MANUFACTURING A PISTON FOR A HYDRAULIC MOTOR HAVING RADIAL PISTONS

This application is a divisional of application Ser. No. 12/295,426 filed Nov. 19, 2008, now U.S. Pat. No. 8,281,707 which is the 371 of PCT/FR07/51043, filed Mar. 30, 2007, which claims priority to French Application No. 0651131, filed Mar. 31, 2006. The disclosures of the above applications are incorporated herein by reference.

BACKGROUND OF THE INVENTION

The present invention relates to a piston for a hydraulic motor having radial pistons, said piston comprising a body having a guiding and sealing surface, a base, and a top, which top is provided with a cradle-shaped recess.

The cradle-shaped recess in the top of the piston serves to receive a roller or wheel designed to roll on the cam of the radial-piston hydraulic motor. In the meaning of the present invention, a cradle-shaped recess has a concave surface that is substantially in the shape of a fraction of a cylinder.

While a radial-piston motor is operating, the cylinder block and the cam of said motor move in rotation relative to each other, and the pistons move radially in reciprocating motion inside the cylinders of the cylinder block, their above-mentioned rollers rolling on the cam.

During this reciprocating motion, the guiding and sealing surface, which is the side surface of the piston (generally in the shape of a cylinder having a base that is circular or of some other shape), co-operates in leaktight manner against the inside surface of the cylinder in which the piston is received. The cylinder block and the cam moving in rotation relative to each other, the piston is subject to tilt forces that are compensated by the guiding due to the mutual co-operation of the two above-mentioned surfaces. The contact pressures between said surfaces can then be relatively high, and it is desirable to attempt to reduce them. In addition, the friction between the guiding surfaces of the pistons and the inside surfaces of the cylinders causes local heating which, if it becomes excessive, can cause the piston to seize. The fluid present in the cylinder, between the end wall of the cylinder and the base of the piston, limits the heating, in the regions in the immediate vicinity of the base of the piston. Unfortunately, in the portion of the guiding and sealing surface that is remote from said base, the cooling is not performed so well, and the risks of seizure can be high, in particular in the middle regions of the guiding and sealing surfaces.

FR 2 648 512 discloses a hydraulic machine having radial pistons, in which machine each piston has a blind cylindrical hole at its base, centered on its axis of translation, the function of that hole not being mentioned.

An object of the invention is to remedy the above-mentioned drawbacks, with a piston that, in addition, can be manufactured simply and inexpensively.

This object is achieved by the fact that the base is provided with an additional cradle-shaped recess whose concave surface faces in the direction opposite from the direction in which the concave surface of the recess in the top faces.

The recess has a concave surface that is substantially in the shape of a fraction of a cylinder, and that is of area larger than the area of the flat end wall of the piston, so that the area of heat exchange with the fluid present in the cylinder is increased, thereby facilitating cooling of the piston. Another reason why this cooling is more effective than the cooling in the prior art is that the fluid present in the recess is at a radial level that is offset outwards relative to the inner end, thereby making it possible to cool zones of the guiding and sealing surface that are somewhat remote from said inside end.

It should also be noted that the presence of the additional recess causes material to be removed from the base of the piston, thereby naturally enabling the piston to be lightened.

Compared with the blind holes of FR 2 648 512, the additional cradle-shaped recess, which is open at its ends situated in the guiding and sealing surface, enables the structure of the piston to be further lightened, enables the flexibility of the portions of the base of the piston that flank the additional recess to be further increased, and enables cooling to be enhanced, by increasing the area of contact between the cylinder and the fluid present in said cylinder under the base of the piston.

Advantageously, the two cradle-shaped recesses extend parallel to each other.

As indicated above, the pistons are subjected to tilt forces relative to their axes of translation, while the cylinder block and the cam are rotating relative to each other. The tilt forces are applied in planes perpendicular to the axis of relative rotation of the cylinder block and of the cam. The cradle-shaped recesses in the tops of the pistons extend parallel to that axis so as to enable the rollers present in said recesses to roll against the cam. In this situation, when the two recesses of a piston extend parallel to each other, the additional recess is also parallel to the axis of relative rotation of the cylinder block and of the cam. Because of the presence of the additional recess, the portions of the guiding and sealing surface that flank the recess present slight flexibility that enables them to deform in planes perpendicular to the axis of the recess. It is thus precisely in the planes in which the tilt forces are high that said portions of the guiding and sealing surface can deform slightly and can thus increase the mutually contacting surface areas. This makes it possible to limit the negative impact of the tilt forces while reducing the contact pressure and while avoiding excessive localized friction.

The invention also provides a method of manufacturing pistons for radial-piston motors from a cylindrical bar having a longitudinal axis, each of said pistons comprising a body having a guiding and sealing surface, a base, and a top, which top is provided with a cradle-shaped recess.

In known methods, each piston is obtained from a billet, e.g. by cutting up a cylindrical bar into segments. Each billet is drilled so as to form the cradle-shaped recess in the top of the corresponding piston, which recess serves to receive the roller of the piston. In practice, a cylindrical hole is drilled in an end portion of each billet, and, optionally, in order to form a stop surface inside the recess in the top of the piston, that hole is modified by means of a tool of the broaching tool type. In particular, said stop surface serves to retain a cradle-shaped journal-bearing lining against the bottom of the recess, against which lining the roller of the piston rolls, which roller is also retained in the recess. Then, that end portion is cut through the hole so that a portion of the hole, which portion defines the cradle-shaped recess, forms the top of the piston, while that end of the billet in which the other portion of the hole was machined is discarded. That results in considerable wastage of material, it being possible for such wastage to be as high as about 50%.

An object of the invention is to improve that state of the art by proposing a method that makes it possible to achieve higher manufacturing rates and that limits wastage of material.

This object is achieved by the fact that the method consists in machining cylindrical transverse holes at regular intervals in the bar, and, in order to form two adjacent pistons, in cutting up the bar on a transverse cutting-up plane passing through a hole, so that a first portion of said hole forms a cradle-shaped recess in the base of the first one of the two adjacent pistons and so that another portion of said hole forms a cradle-shaped recess in the top of the second one of the two adjacent pistons.

With the method of the invention, the holes are machined directly in the bar, prior to cutting up said bar, and they can thus be formed automatically under excellent conditions. In particular, it is easier to hold the bar correctly over a long length, than to hold the individual billets as in the prior art, while performing the hole-forming operations. In addition, with the invention, a very significant saving in material is achieved because no hole is "wasted", each hole having a first portion that serves to form the recess in one piston, and a second portion that serves to form the recess in the adjacent piston.

If machining (in particular broaching) is necessary for forming stop surfaces in the recesses in the tops of the pistons, such machining is performed in the bar that is provided with the series of holes, before said bar is cut up.

In addition, each of the pistons obtained by means of this method has two recesses, thereby as indicated above, offering major advantages as regards limiting contact pressures, friction, and weight, and improving cooling of the pistons equipping a radial-piston hydraulic motor.

BRIEF DESCRIPTION OF THE DRAWING FIGURES

The invention can be well understood and its advantages appear more clearly on reading the following detailed description of an embodiment shown by way of non-limiting example. The description refers to the drawings, in which.

DETAILED DESCRIPTION OF THE PREFERRED EMBODIMENTS

Figure 1:
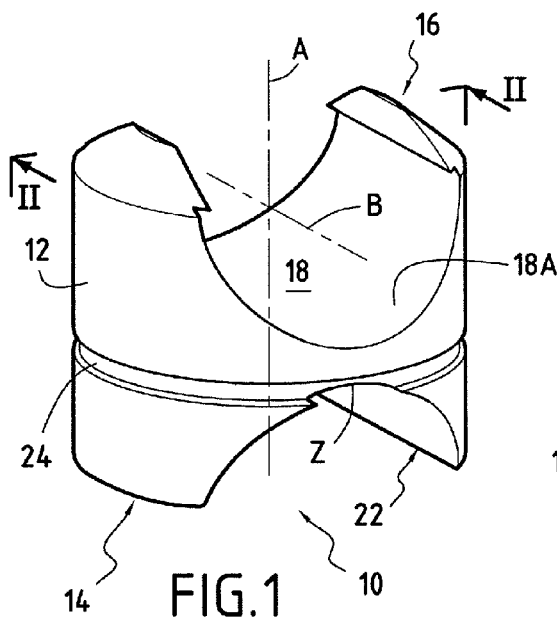
FIG. 1 is a perspective view of a piston of the invention.

The piston of FIG. 1 comprises a body 10 having a guiding and sealing surface 12, a base 14 and a top 16.

The guiding and sealing surface is substantially in the shape of a cylinder having a base that is circular or of some other shape, the cylindrical shape of the surface matching the shape of the cylinder in which the piston is designed to slide. The base of the piston is its end that, when the piston is installed in the cylinder of a radial-piston motor, is closer to the end wall of the cylinder. The top of the piston is opposite from its base.

It can be seen that the top 16 of the piston is provided with a cradle-shaped recess 18. On the top of the piston, said recess forms a concave surface 18A that is substantially in the shape of a fraction of a cylinder of axis B perpendicular to the axis A of symmetry of the piston, which axis of symmetry is the axis along which the piston is designed to move in translation in the cylinder block of a motor having radial pistons.

The cradle-shaped recess 18 serves to receive a roller in the top of the piston, which roller is designed to roll against the cam of the radial-piston motor. As can be seen more clearly in FIG. 2, the cradle-shaped recess 18 extends over greater than 180°, so that the distance DE between the edges of the recess 18 is slightly less than the diameter D of the cylindrical surface for supporting said roller. In the example shown, a lining 20 is received against the surface 18A of the cradle-shaped recess and is retained upwards by a shoulder 19 of the recess. The cylindrical surface for supporting the roller is defined by the outside cylindrical surface 20A of the lining, which surface is flush with the portion of the recess 18 that extends between the shoulders 19 and the top edge of the piston.

The base 14 of the piston is provided with an additional cradle-shaped recess 22 whose concave surface faces in the direction opposite to the direction in which the concave surface of the recess 18 of the top faces. It can be seen in FIG. 2 that the two cradle-shaped recesses 18 and 22 extend parallel to each other. The recess 22 also forms a concave surface that is substantially in the shape of a fraction of a cylinder of axis B' parallel to the above-mentioned axis B. It can also be seen that both of the axes B and B' intersect the axis A of the piston, so that the recesses 18 and 22 have a common plane of symmetry defined by the axes A, B, and B'. Unlike the recess 18, the additional recess 22 extends over less than 180°.

The surface 12 is provided with an annular groove 24 that is suitable for receiving a sealing member such as a piston ring or gasket. It can be seen in FIGS. 1 and 2 that the crest S22 of the cradle-shaped recess 22 is situated in the vicinity of the groove 24, and indeed that said recess and said groove have a zone of intersection Z.

Figure 3:
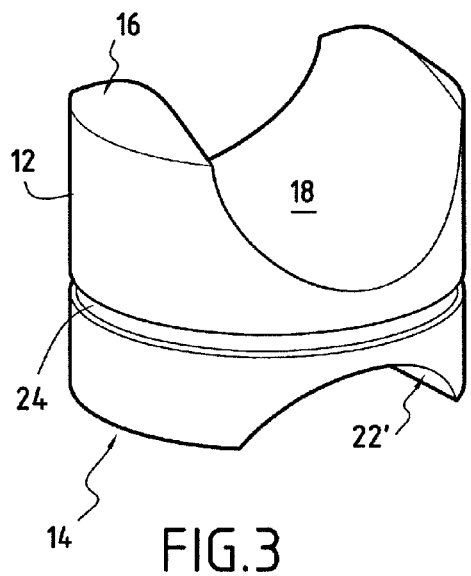
FIG. 3 is a view analogous to FIG. 1, for a variant piston.
Figure 4:
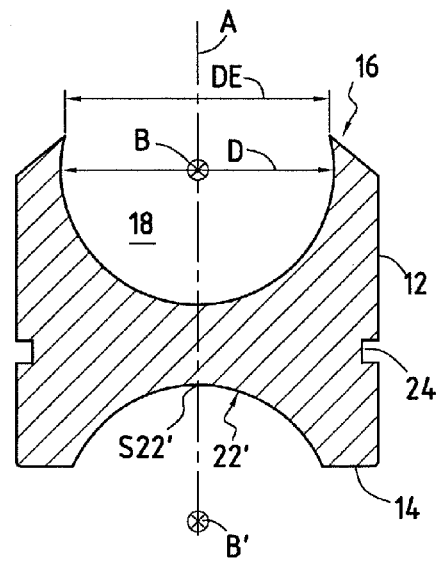
FIG. 4 is a view analogous to FIG. 2, for the piston of FIG. 3.

In the example of FIGS. 3 and 4, the additional recess 22' is very slightly shallower, and it can be seen that, although its crest S22' also extends in the vicinity of the groove 24 in the surface 12 of the piston, said crest does not intersect the groove.

Figure 2:
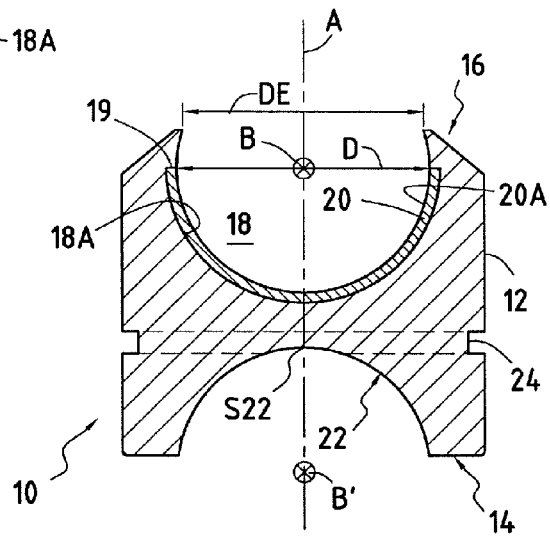
FIG. 2 is a section view on plane II of FIG. 1, containing the axis of translation of the piston, and perpendicular to the axis of its cradles.

Otherwise, the recesses 18 and 22' are analogous to the recesses 18 and 22 of FIGS. 1 and 2, it being emphasized in particular that the concave cylindrical surface of the recess 18 extends over greater than 180°, unlike the concave surface of the recess 22'.

FIGS. 3 and 4 show a piston that has no lining, and whose recess receives the roller directly. Preferably, and as shown in FIGS. 1 and 2, the cradle-shaped recess 18 extends over greater than 180°, so that the distance DE between the edges of the recess 18 is slightly less than the diameter D of the cylindrical surface for supporting said roller or wheel.

In reality, and as explained below with reference to the manufacturing method of the invention, the surfaces of the two recesses 18 & 22 or 18 & 22' are substantially complementary fractions of a complete cylindrical surface, ignoring the setback in which the lining 20 is received, when such a setback is provided.

It is advantageous for the additional recess to extend to the vicinity of the groove 24, so as to lighten as much as possible the structure of the piston, the crests of the two recesses being relatively close to each other. Depending on the type of sealing member used, the groove 24 can have an intersection with the additional recess which, however, does not pass through it completely, or indeed, it can be preferable for such an intersection not to exist.

The method of the invention is described below with reference to FIGS. 5A to 5F. A starting bar 30 has a longitudinal axis L, and has a cylindrical shape corresponding to the geometrical envelope of the guiding and sealing surface of the pistons that are to be formed from said bar. Holes 34 extending transversely relative to the longitudinal axis L are machined in said bar, the holes being disposed at regular intervals along the length of the bar and having a common plane of symmetry PS that contains the longitudinal axis L of the bar and the axes B of the holes. For example, in order to machine the holes 34, a plurality of drill bits 32 are used that are spaced apart uniformly, or else one drill bit is used that is moved along the bar after each hole has been formed.

Figure 5A:
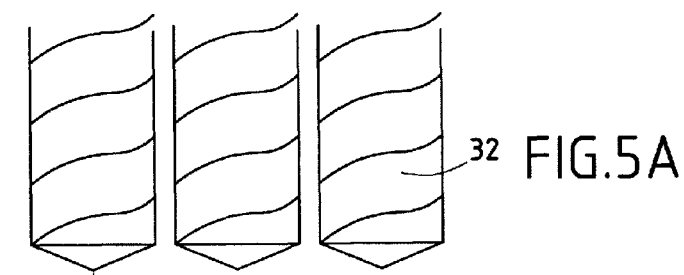
FIGS. 5A to 5F show the manufacturing method of the invention.
Figure 5B:
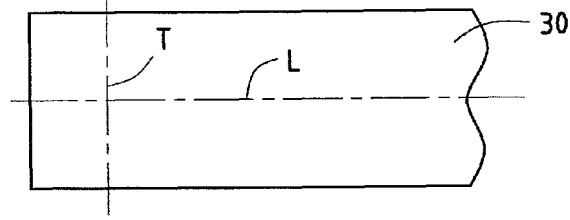
Figure 5C:
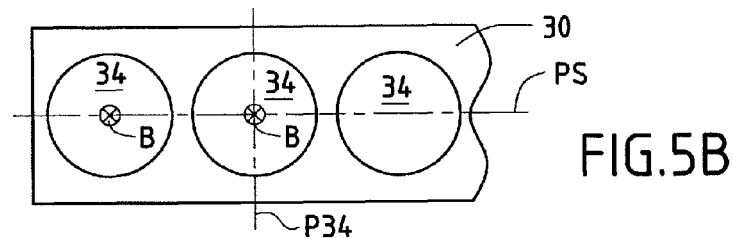

In FIG. 5B, the bar has been turned through 90° relative to FIG. 5A, so that it is possible to see the holes. The holes 34 are cylindrical. In order to form stop surfaces (shoulders 19) in the recesses 18 in the tops of the pistons, when such stop surfaces are desired, it is possible to perform a specific machining step. This is shown in FIG. 5C in which it can be seen that broaching tools 36 can be inserted into the holes 34 so as to modify the inside surface locally.

Figure 5D:
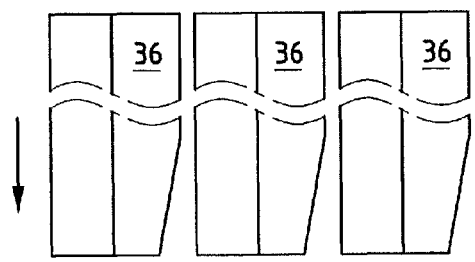
Figure 5D:
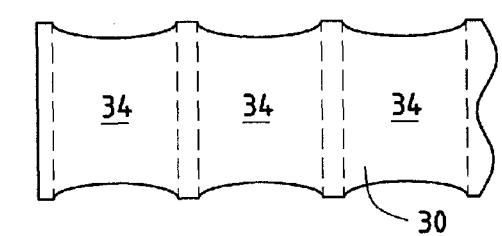
Figure 5E:
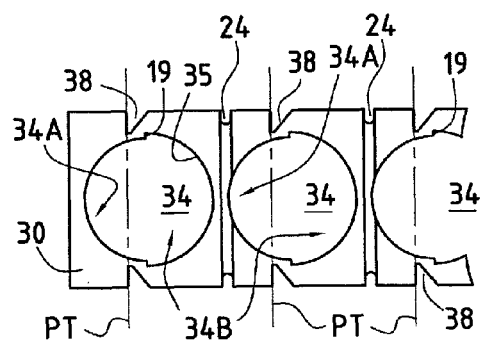

In FIG. 5D, it can be seen that setbacks 35 in the shape of cylinder fractions have been formed in the holes by forming shoulders 19 that extend parallel to the axes of the cylinders. For example, each of the setbacks extends over about 180°.

Figure 5F:
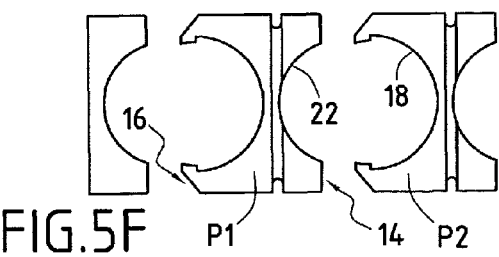

As shown in FIG. 5F, sealing gasket grooves 24 are formed, e.g. by turning, in the cylindrical surface of the bar 30 (they can also be formed during the first operation for forming the bar), and separation zones 38 are also formed between pistons at regular intervals. Said zones 38 are groove portions that are formed in the walls of the holes. They can be formed simultaneously with the grooves 24 or separately therefrom, by a milling operation. The separation grooves 38 generate zones of local fragility facilitating cutting up the bar into segments at said separation grooves. They also make it possible to bevel the tops of the pistons. It can be seen in FIG. 5E that each groove 38 occupies a plane PT that is transverse to the bar 30, which plane intersects a hole 34. In order to form two adjacent pistons, the segment of bar is cut on such a plane PT so that a first portion 34A of the hole 34, which portion is situated on a first side of the plane PT, serves to form a cradle-shaped recess 22 in the base 14 of a piston P1, and so that another portion 34B of said hole, which portion is situated on the other side of the plane PT, serves to form a recess 18 in the top of a piston P2. The pistons P1 and P2 are adjacent while they are being manufactured, since they are defined on either side of a common cutting-up plane PT.

Rectification operations can be performed on the pistons P1 and P2. However, it can be understood that the recess 22 of the piston P1 corresponds almost entirely to the first portion 34A of the hole 34, and that the recess 18 of the piston P2 corresponds almost entirely to the second portion 34B of said hole. In other words, the two recesses 18 and 22 are two substantially complementary fractions of the complete cylindrical surface of the hole 34, ignoring the setback 35, when said setback is present. By comparing FIGS. 5B and 5E, it can be seen that the transverse cutting-up plane PT is offset relative to the transverse plane of symmetry P34 of the hole 34 through which the plane PT passes. The plane P34 is transverse to the axis L of the bar and it contains the axis B of the hole. Thus, when the bar is cut up on the plane PT, the two recesses coming from the hole 31 are of different sizes. The recess 22 of the base of the piston P1 is the smaller of the two recesses.

In accordance with the invention, a plurality of piston manufacturing steps are performed on the bar 30, before the individual pistons are separated. Said bar can be initially cut to the desired length, compatible with the dimensioning of the machining machine. It can be a bar segment of several tens of centimeters.

In particular, the operations of machining the holes 34 and the grooves 38 and 24 are performed on the bar. In general, machining operations such as turning and milling are advantageously performed on the bar. It is also possible to make provision for certain additional machining operations, e.g. rectification, treatment, coating, lining, or de-burring to be performed on the machined bar, before said machined bar is cut up into individual pistons, with the advantage of reducing the handling operations. This feature can even facilitate cutting up the bar because certain treatments can increase the local fragility of the separation zone in each groove 38, thereby facilitating cutting up. For example, the quantity of material defined between the end wall of the groove 38 and the hole 34 can be small enough for cutting up to be obtained merely by applying a sufficiently violent impact.

The invention claimed is:

1. A method of manufacturing pistons for a hydraulic motor having radial pistons, each piston having a base, a top and a cradle-shaped recess, the method comprising the steps of:

providing a cylindrical bar having a longitudinal axis, machining cylindrical transverse through holes spaced apart uniformly in the bar, and in order to form two adjacent pistons, cutting up the bar on a transverse cutting-up plane passing through one of said holes, so that a first portion of said hole forms a cradle-shaped recess having substantially the shape of a fraction of a cylinder in the base of the first one of the two adjacent pistons and so that another portion of said hole forms a cradle-shaped recess having substantially the shape of a fraction of a cylinder in a top of the second one of the two adjacent pistons.

2. A method according to claim 1, wherein the transverse cutting-up plane is offset relative to a transverse plane of symmetry of the hole through which said cutting-up plane passes so as to form the cradle-shaped recess in the base of the first one of the two adjacent pistons to be smaller than the cradle-shaped recess formed in the top of the second one of the two adjacent pistons.

3. A method according to claim 1, wherein additional machining operations, comprising at least one of rectification, treatment, de-burring, coating, lining, turning and milling are performed on the bar before the cutting step.

* * * * *